(12) United States Patent
Cazden

(10) Patent No.: US 6,276,200 B1
(45) Date of Patent: Aug. 21, 2001

(54) LIQUID LEVEL CONTROLLER

(76) Inventor: Michael L. Cazden, 625 N. Whitney Ranch Dr., Apt. 712 Henderson, NV (US) 89014-2625

(*) Notice: Subject to any disclaimer, the term of this patent is extended or adjusted under 35 U.S.C. 154(b) by 0 days.

(21) Appl. No.: 09/451,903

(22) Filed: Dec. 1, 1999

Related U.S. Application Data

(60) Provisional application No. 60/113,767, filed on Dec. 23, 1998.

(51) Int. Cl.[7] .............................. G01F 23/30; G01F 23/00; F04H 4/00; F16K 31/18
(52) U.S. Cl. .............................. 73/305; 73/290; 73/307; 73/309; 73/314; 137/428; 4/506; 4/507; 4/508; 4/509
(58) Field of Search .................................. 73/290 R, 305, 73/307, 309, 314; 137/428; 4/506, 507, 508, 509

(56) References Cited

U.S. PATENT DOCUMENTS

| | | |
|---|---|---|
| 3,895,402 | 7/1975 | Page . |
| 4,115,877 | 9/1978 | Wall . |
| 4,380,091 | 4/1983 | Lively . |
| 4,445,238 | 5/1984 | Maxhimer . |
| 4,612,949 * | 9/1986 | Henson ................................ 137/2 |
| 4,724,552 * | 2/1988 | Kinkead et al. ..................... 4/508 |
| 4,771,272 * | 9/1988 | Barnes ................................ 340/624 |
| 5,154,205 | 10/1992 | Langill . |
| 5,247,710 | 9/1993 | Carder et al. . |
| 5,365,617 * | 11/1994 | Tarr .................................... 4/508 |
| 5,616,239 | 4/1997 | Wendell et al. . |
| 5,878,447 | 3/1999 | Mogab et al. . |

* cited by examiner

Primary Examiner—Hezron Williams
Assistant Examiner—Dennis Loo
(74) Attorney, Agent, or Firm—Johnson & Stainbrook, LLP; Larry D. Johnson; Craig M. Stainbrook

(57) ABSTRACT

A liquid level control system utilizes a sensor that is attached to a fixed support relative to a liquid container and transmits radio-frequency signals to a remotely located liquid supply system depending upon fluctuations in the liquid level. In the context of a swimming pool, the sensor housing is attached to a sidewall of the pool, at the desired water level. A sensor circuit located within the housing floats at the liquid level, and as changes occur, movement of the floating sensor results in the transmission of signals to either activate or deactivate a supply valve that supplies replacement water to the pool. A small opening located at an upper portion of the sensor housing cooperates with the floating sensor to dampen the motion of the sensor, providing a more accurate reading of the liquid level.

8 Claims, 5 Drawing Sheets

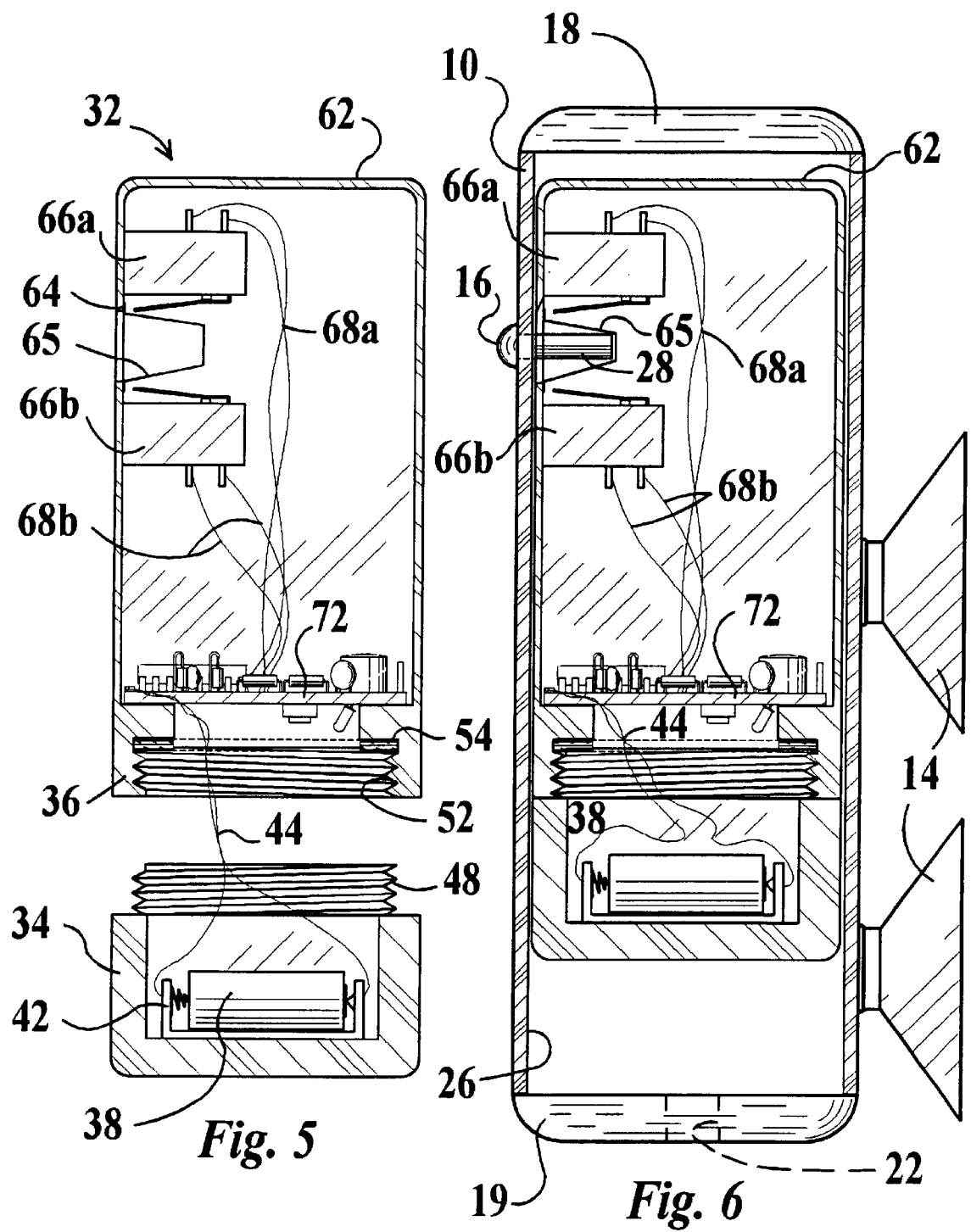

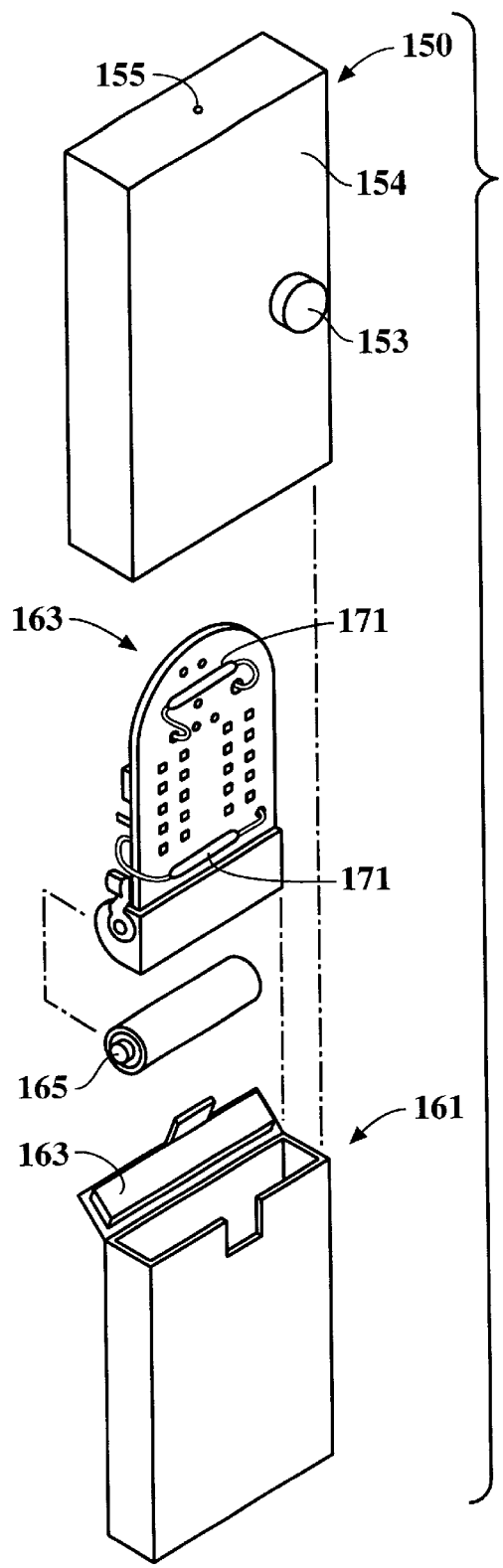
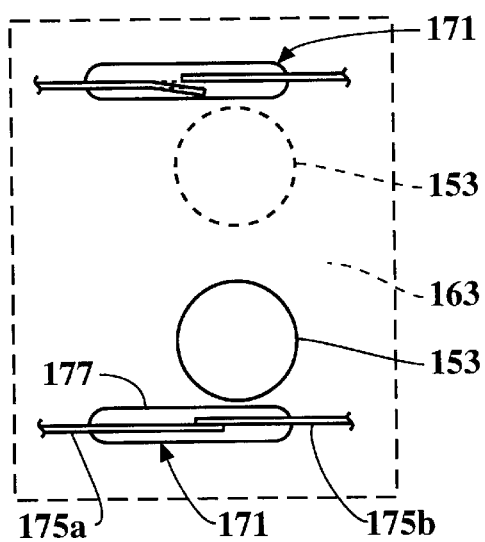
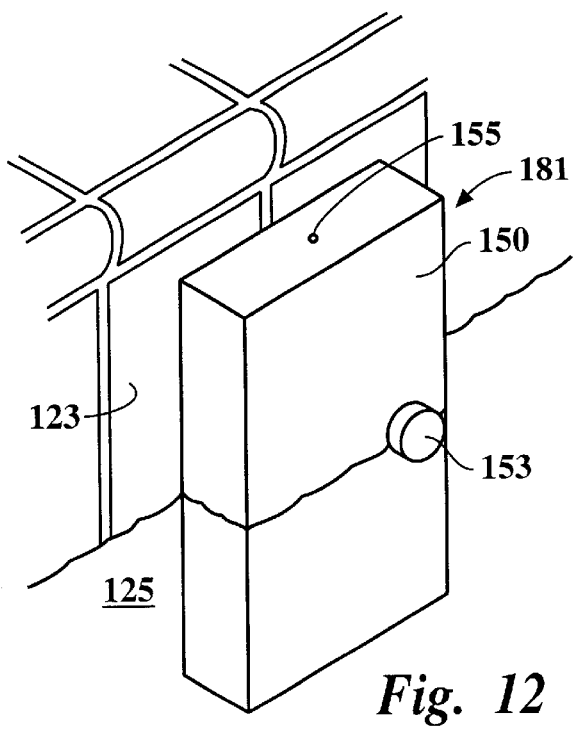
Fig. 10
Fig. 11
Fig. 12

LIQUID LEVEL CONTROLLER

CROSS-REFERENCE TO RELATED APPLICATION

This application claims the benefit of U.S. Provisional Application, Ser. No. 60/113,767, filed Dec. 23, 1998.

BACKGROUND OF THE INVENTION

1. Field of the Invention

The present invention relates to the general field of liquid containers and, more particularly, to control systems for maintaining a liquid level within such containers. More specifically, the present invention relates to a control valve and remote sensor system for regulating the fill level in a swimming pool or similar liquid container.

2. Description of the Prior Art

Modern technology has in many ways simplified the problem of swimming pool upkeep. The availability of more sophisticated chemical treatments, as well as the use of modern skimmers, recirculators, and filtering apparatus, have significantly lessened the manual labor required to maintain sanitary and esthetically pleasing swimming pools. For these technologies to work, however, it is necessary to keep the water level of a swimming pool within a relatively narrow range.

In the past, visual references have been relied upon to maintain the water level within a swimming pool. Upon observing a decrease in the water level, a supply of makeup water would be provided, frequently by manually operating a water control valve. Since even a slightly a low water level can require a large restorative volume, domestic water systems may require several hours before the water level has been restored. This time factor alone makes this task unpleasant, with inattention resulting in over filling, or worse, flooding the surrounding pool area.

The desirability of providing automatic means for maintaining the water level in swimming pools has long been appreciated. Without the need for manual supervision or intervention, the water level of a swimming pool would be maintained within the required maximum and minimum limits.

Systems for monitoring and controlling the water level in a swimming pool or other fluid reservoir are well known to the art. The majority of such systems are not suitable for use in retrofitting in-ground pools, requiring a significant amount of structural modifications to the pool deck and/or the pool walls. In addition to being difficult to install, such conventional water leveling systems are frequently costly to maintain. They often include moving parts that, because of their continual contact with water, are extremely susceptible to damage caused by fatigue corrosion and the accumulation of calcium and other mineral deposits.

Other conventional water leveling systems utilize floats, which are susceptible to corrosion and to failure as a result of the accumulation of calcium and other mineral deposits. Installation of float systems in existing swimming pools also normally requires additional concrete construction (and destruction) as portions of existing pool walls and pool decks are replaced. Until recently, the use of electrical sensors in water level control systems has encountered resistance in implementation due to safety considerations.

In addition to the problems inherent in retrofitting a complex sensor and water control unit adjacent an existing pool, there are also the previously mentioned safety concerns regarding those designs that use electrical communication between the sensor and the control valve unit(s). The need thus exists for a swimming pool water level control system that can be quickly and inexpensively installed and maintained on existing swimming pools. A further advantage would be obtained by utilizing a design that minimizes the opportunities for electrical shock hazards during operation of the water level controller.

SUMMARY OF THE INVENTION

The present invention provides an automatic liquid regulation system that can be used to maintain a desired liquid level in a container, such as the desired water level in a swimming pool. A remote sensor is placed in the container/pool, and monitors changes in the liquid level therein. At such time as the liquid level falls below a desired level, the sensor detects such a drop, and transmits a signal to a remotely located supply valve to open and permit the flow of additional liquid into the container/pool. Once the desired level is again achieved, a supplemental signal causes the supply valve to close, terminating the fill operation.

It is an object of the present invention to provide an automatic liquid level regulator that can be easily placed within a liquid container in a manner requiring no particular receiving structure or any connections to an existing power supply. As such, retrofitting a liquid level control system to existing containers is particularly enabled utilizing the sensor of the present invention.

It is an additional object of the present invention to provide an automatic liquid level regulator that can be removably attached to a sidewall of a liquid container, such as the side of a conventional in ground swimming pool.

It is a further object of the present invention to provide an automatic liquid level regulator that maintains the liquid level within a container, such that a fall in the liquid level below a predetermined level results in the activation of a fill valve to cause the flow of liquid into the container until reaching a predetermined liquid level within the container, whereupon deactivation of the fill valve occurs.

In this regard, an outer housing containing the sensor is placed against the sidewall of the liquid container. The liquid level sensor is provided a separate housing that is slidably received within the outer housing. Liquid is permitted entry into the outer housing upon its placement in the container, with the sensor housing being "floated" by such liquid within the outer housing.

Upon placement of the outer housing at the liquid level within the container, subsequent changes in that level result in movement of the sensor housing relative to the outer housing. Such movement is utilized in the present invention to activate mechanical switches, which in turn result in the transmission of radio-frequency signals to a remotely located supply valve. Such valving controls liquid for replenishment of the container, and its activation in accordance with the movement of the sensor housing is utilized in the present invention to automatically control the liquid level in the container.

Further objects and advantages of the present invention shall become apparent from the ensuing description and as illustrated in the accompanying drawings.

BRIEF DESCRIPTION OF THE DRAWINGS

FIG. 5 is a side elevation view, in cross-section, showing the interior portions of a water level sensor in accordance with the present invention;

FIG. 6 is a side elevation view, in cross-section, showing a water level sensor as received within an outer housing in accordance with the present invention;

FIG. 10 is an exploded perspective view showing an alternate liquid level sensor and outer housing in accordance with the present invention;

FIG. 11 is a perspective view of the alternate sensor and housing of FIG. 10 shown positioned to monitor a liquid level in accordance with the present invention; and FIG. 12 is a partial side elevation view, with portions in phantom, showing the liquid level sensor of FIGS. 10 and 11 at separate liquid levels in accordance with the present invention.

DETAILED DESCRIPTION OF THE PREFERRED EMBODIMENTS

Figure 1:
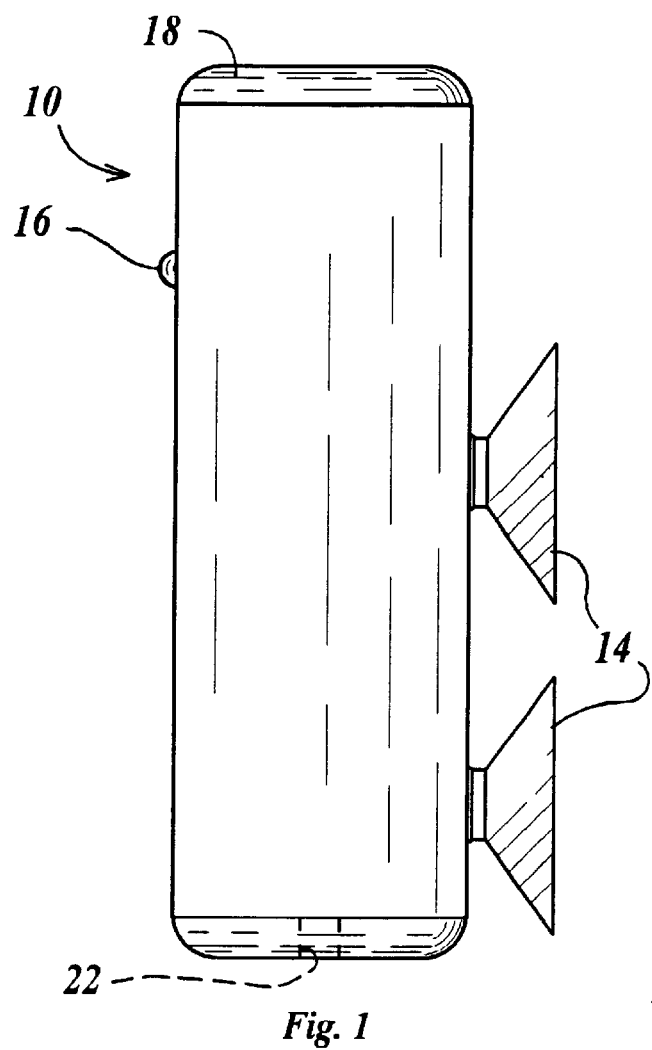
FIG. 1 is a side elevation view showing an outer housing for a water level detector in accordance with the present invention.

Reference is now made to the drawings wherein like numerals refer to like parts throughout. An outer housing 10 is shown in FIG. 1 having a pair of suction cups 14 attached to a lateral side thereof. A reference probe 16 is also shown attached to a lateral side of the housing 10, the purpose of which will be discussed hereinafter.

In a presently preferred embodiment, the outer housing 10 is cylindrical, and is provided an upper cover 18 that is attached to and sealing a first end and a lower cover 19 attached to and sealing a second end. A liquid passageway 22 is formed in the cover 18, permitting entry of the water or other liquid during operation of the water level controller of the present invention.

Figure 2:
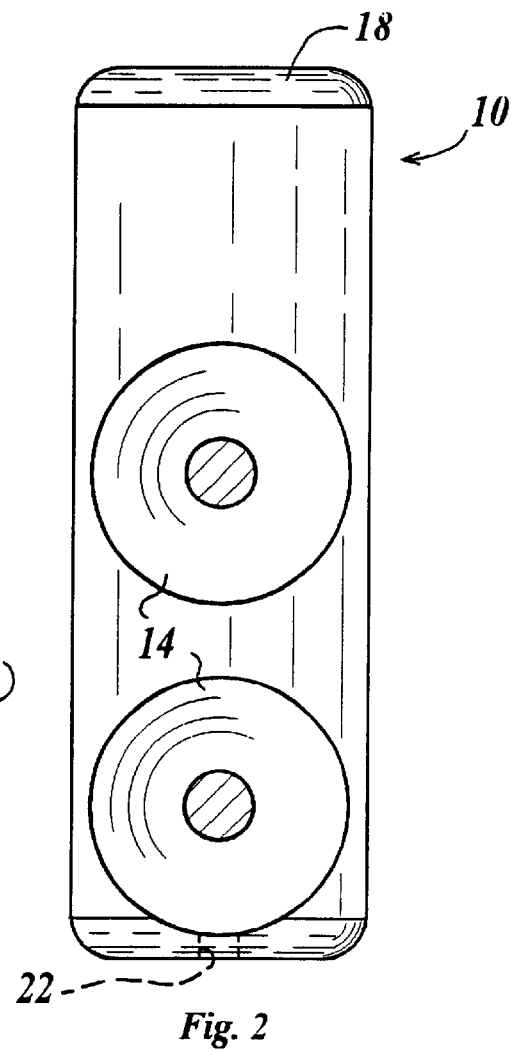
FIG. 2 is a rear elevation view, similar to FIG. 1, showing a manner of attachment provided the outer housing in accordance with the present invention.
Figure 3:
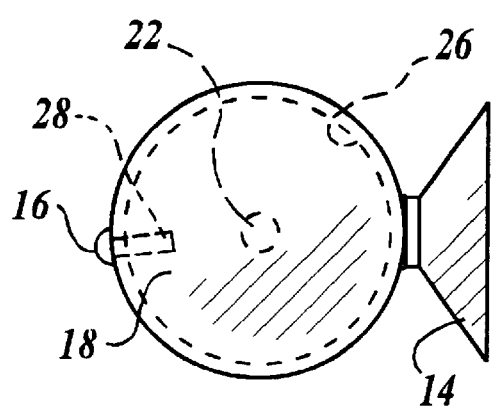
FIG. 3 is a top plan view, with portions in phantom, showing an outer housing for a water level sensor in accordance with the present invention.
Figure 4:
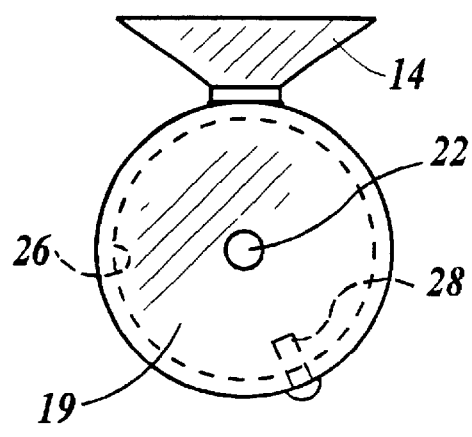
FIG. 4 is a bottom plan view, similar to FIG. 3, showing an open bottom provided in an outer housing for a water level sensor in accordance with the present invention.

When in the cylindrical form depicted in FIG. 1, the cylindrical housing 10 is preferably installed with the longitudinal axis in a vertical orientation. FIG. 2 illustrates such positioning, as well as the manner in which the suction cups 14 are arranged in a superposed relation. Additionally, although so depicted in FIGS. 3 and 4, there is no requirement that the liquid passageway 22 be concentric with the central longitudinal axis. The function of air pressure equilibrium can be obtained so long as the liquid passageway 22 is formed in the lower cover 19 at any radial location inside of an inner housing wall 26.

FIG. 5 shows a presently preferred embodiment of a water level sensor 32. A power unit 34 is shown as separable from a transmitter unit 36. A dry cell battery 38 is received within a conventional electric contact-retaining clip 42. Enabling the detachment of the power unit 34 from the transmitter unit 36 greatly simplifies access to the dry cell battery 38 when replacement is required. A pair of power supply conductors 44 communicates electrical power from the dry cell battery 38 to the transmitter unit 36.

It is to be understood and appreciated that other options exist for conducting power supplied by the power unit 34 to the transmitter unit 36. One such method would provide opposing electrical contacts (not shown in the Figures) that abut one another on such occasions as the power unit 34 is fully received within the transmitter unit 36. Other electrical pathways can be created utilizing known techniques without departing from the teachings of the present invention.

To prevent corrosion as well as electrical shorting problems is preferable that a watertight connection be established between the power unit 34 and the transmitter unit 36. Here also, a number of different connections are possible to obtain such a sealed fit. In FIG. 5, a spiral sequence of tightly spaced threads 48 are received within a correspondingly scored cylindrical wall 52 that terminates in a replaceable, resilient sealing ring 54.

The transmitter unit 36 is defined by a cylindrical outer wall 62 that has a vertically oriented receiving slot 64 formed in a lateral portion thereof. The inadvertent entry of liquid through the receiving slot 64, a flexible slot membrane 65 is attached about the periphery of the receiving slot 64, and extends into the transmitter unit 36.

A pair of opposing electrical contacts switches 66a, 66b are attached to the outer wall 62, each at a location adjacent a separate terminus of the receiving slot 64. In this manner, the pair of contact switches 66a, 66b is vertically superposed in relation to one another. A pair of electrical connectors 68a, 68b are each attached to a respective one of the pair of contact switches 66a, 66b, and to a transmitter circuit 72. The making and/or breaking of an electrical contact by the pair of electrical contact switches 66a, 66b is communicated by the pair of electrical connectors 68a, 68b to the transmitter circuit 72.

Placement of the water level sensor 32 within the outer housing 10 is depicted in FIG. 6. The water level sensor 32 is so positioned as to place the receiving slot 64 of the outer wall 62 adjacent the reference probe 16. This in turn permits the reference probe shaft 28 of the reference probe 16 to be received by the receiving slot 64 and project into the water level sensor 32, while remaining inside of the flexible slot membrane 65.

The reference probe shaft 28 extends (within the flexible slot membrane 65) between the pair of contact switches 66a, 66b, which are both provided with a switch contact lever 76 that projects in a direction toward the reference probe shaft 28. The water level sensor 32 is received within the outer housing 10 in a manner that permits movement along the lateral axis of the outer housing 10. The receiving slot 64 is sufficiently elongated along the lateral axis of the outer housing 10 to permit movement of the reference probe shaft 28 relative to the positioning of the water level sensor 32.

The electrical contact switches 66a, 66b are placed adjacent the receiving slot 64 in a manner that defines two transitional switch positions. A first position results in deflection of a first switch contact lever 76a of the first contact switch 66a, with movement to a second, subsequent lateral position resulting in the deflection of a second switch contact lever 76b of the second electrical contact switch 66b. In this manner, changes in the relative position of the inner housing 32 within the outer housing 10 are utilized to activate one or both of the electrical contact switches 66a, 66b.

Figure 7:
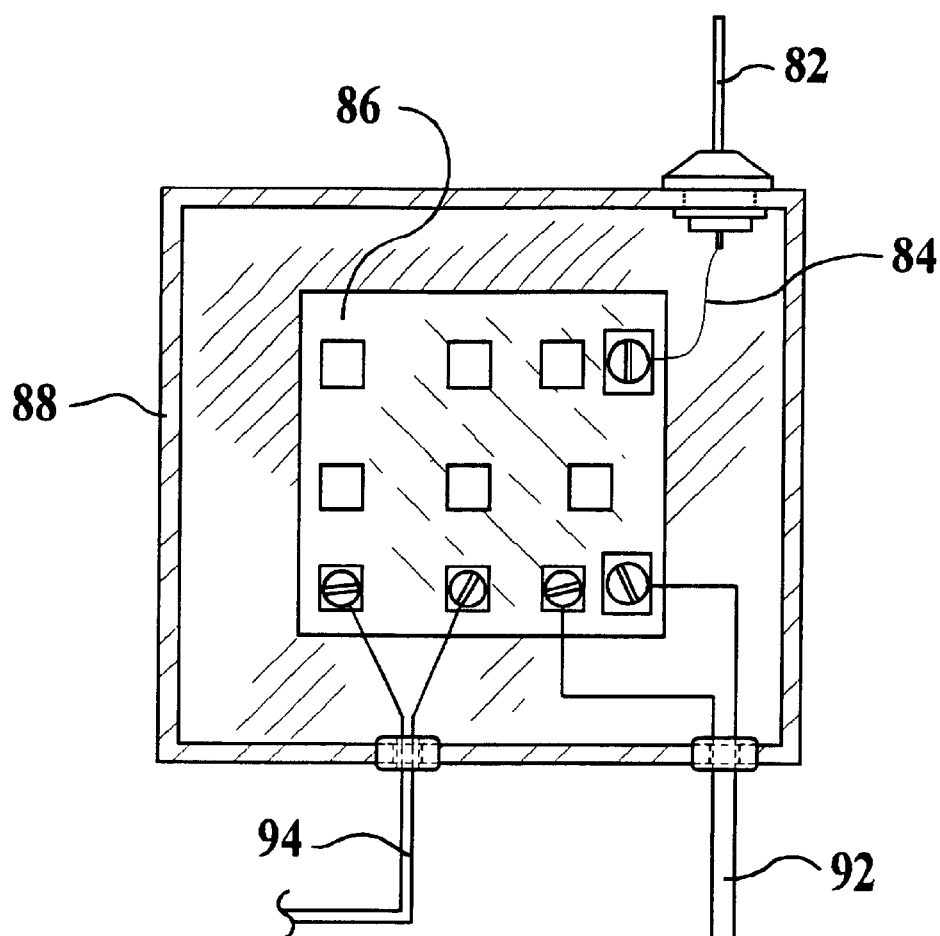
FIG. 7 is a partial side elevation view, in cross-section, showing a water level controller receiver unit in accordance with the present invention.

Electrical switch activation results in the transmission of a signal from the electrical contact switches 66a, 66b through the electrical connectors 68, to the transmitter circuit 72. A signal (not shown in FIG. 6) is then transmitted, for receipt by a receiver antenna 82 shown in FIG. 7. The transmitted signal is then communicated through a receiving wire 84 to a receiver circuit 86 that is located within a receiving housing 88. A power supply 92 provides electrical power to the receiver circuit 86 and one or more activation wires 94 (only one set shown in FIG. 7) are provided to communicate activation signals from the receiver circuit 86 to one or more electrical devices (not shown in FIG. 7).

Figure 8:
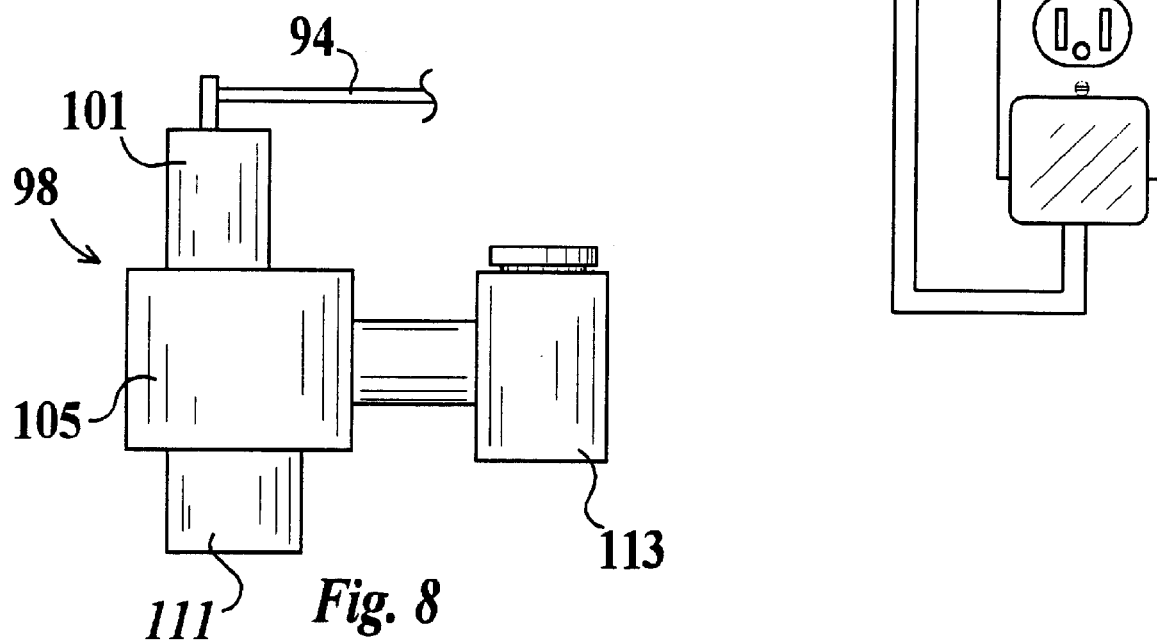
FIG. 8 is a partial representational view showing a remotely located control valve in accordance with the present invention.

In FIG. 8, a pair of activation wires 94 is shown terminating in an actuator valve assembly 98. Upon receipt of an electrical signal through the activation wires 94, a solenoid 101 within the valve assembly 98 is activated, causing movement of a valve assembly 105 to which the solenoid is mechanically attached. A water supply conduit 111 is connected to a first side of the valve assembly 105, with a water discharge conduit 113 is connected to a second side thereof. The selective activation of the solenoid 101 by signals provided through the activation wires 94 permits control of water flow through the actuator valve assembly 98 by controlling the positioning of the valve assembly 101.

Figures 9, 9A:
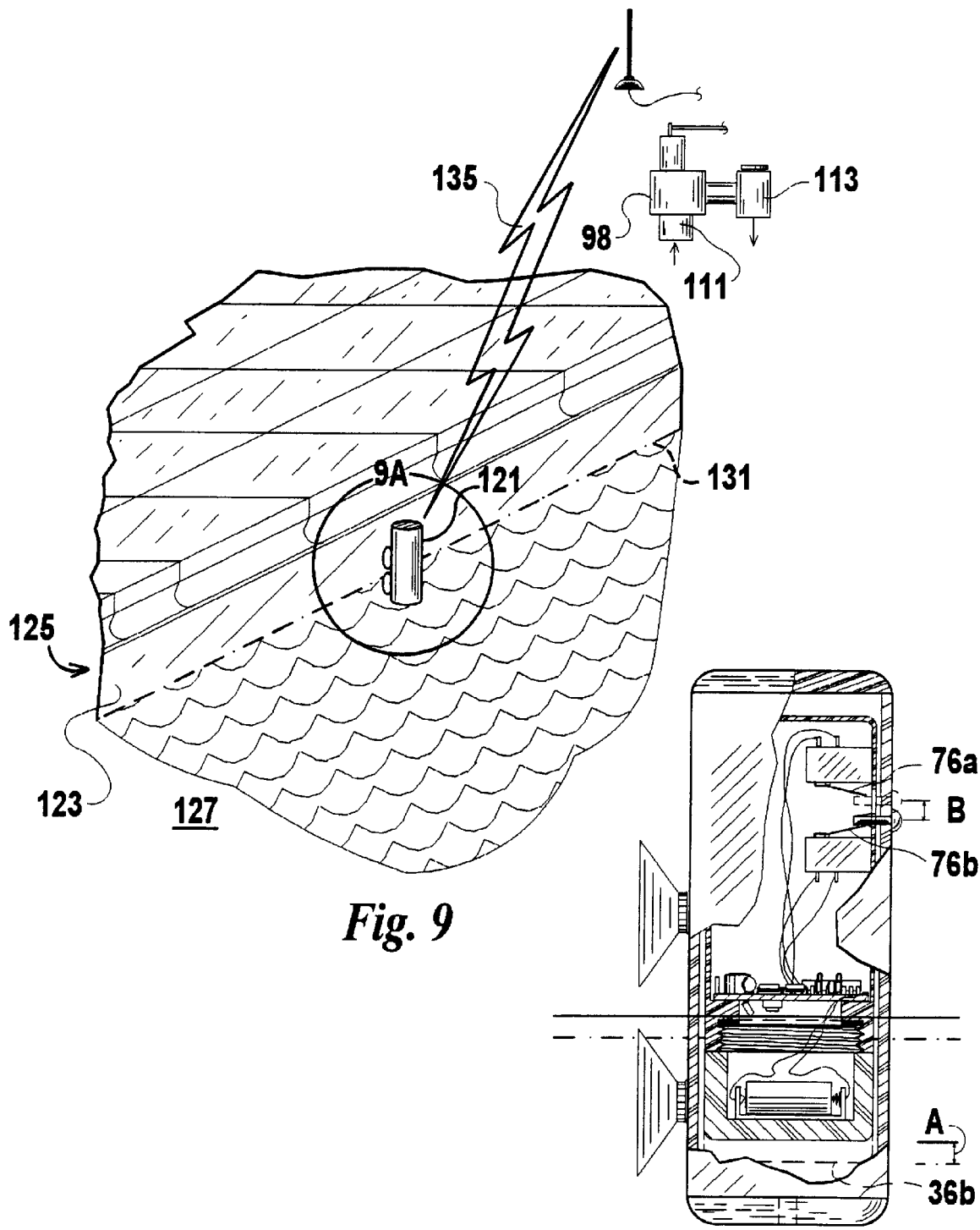
FIG. 9 is a partial perspective view, with portions broken away and portions schematically depicted, showing a water level control system in accordance with the present invention.
FIG. 9A is an enlarged side elevation view, with portions broken away and portions in phantom, showing the manner in which a water level sensor in accordance with the present invention interacts with the water level existing in a swimming pool in accordance with the present invention.

The overall manner in which the level controller of the present invention operates is generally depicted in FIG. 9. A water level controller 121 is shown attached to a sidewall 123 of a swimming pool 125. Pool water 127 forms a water level 131. The water level controller 121 is so located on the pool side wall 123 that when the desired water level 131 is achieved, the reference probe shaft 28 lies between the pair of switch contact levers 76 without activating either (see FIG. 9a).

Upon a change in the water level 131, for example a drop due to evaporation of the pool water 127, the water level sensor 32 moves downward within the outer housing 18 (shown in phantom as the transmitter unit 36b in FIG. 9A). This in turn results in the reference probe shaft 28 making contact with the lower switch contact lever 76b. The transmitter circuit 72, causing activation of the solenoid 101 and the valve assembly 105 of the actuator valve assembly 98 generates a radio-frequency signal 135. Opening of the valve assembly 105 then permits water from the water supply conduit 111 to flow out the water discharge conduit 113 and into the swimming pool 125.

As the water continues to flow into the swimming pool 125, the water level 131 will rise, resulting in a rising of the water level sensor 32 within the outer housing 10 of the water level controller 121. The reference probe shaft 28, which is attached to the outer housing 10, will move from its position adjacent the upper switch contact lever 76a, until the continued rising of the water level 131 results in a deflection of the lower switch contact lever 76b, and the subsequent generation of another radio frequency signal 135. Upon receipt of this second signal, the solenoid 101 is again activated, this time to close the valve assembly 105 and shut off the flow of water through the actuator valve assembly 98 and through the water discharge conduit 113. Water is then no longer being supplied to the swimming pool 125 until a lowering of the water level 131 causes this activation cycle to begin again.

As the transmitter unit oscillates between the maximum and minimum water levels, the distance traveled (shown as reference letter A) is equal to the distance between the distance the reference probe shaft 28 travels between the pair of switch contact levers 76a, 76b (shown as reference letter B). The manner in which the water level sensor 32 fits within the outer housing 10, and the absence of air passageway in the upper cover 18 is made use in the present invention as a dampener. By resisting the instantaneous movement of the water level sensor 32, caused by the movement of swimmers and the like, the present invention lessens the "false alarm" response to temporary changes in water level.

In a presently preferred embodiment, the transmitter circuit is provided a timing circuit that ends the transmission of a signal after an appropriate period of time. Specifically, once the signal is sent to the receiving unit, it will continue for only a short period to time to ensure its receipt, and then will end. To continue this signal for so long as the switch contact lever remains depressed will result in more rapid battery exhaustion. Once the pool has been filled, the other switch contact will be depressed, sending a new signal that will shut off the water line. It too will then be timed out.

In a preferred embodiment, the outer housing 10 is fabricated out of a clear polycarbonate and the inner housing wall out of lightweight plastic tubing. A presently preferred dimension of the outer housing is 6" to 8" long and 2" in diameter. The inner water level sensor has dimensions of 4" to 6", with a diameter of approximately 1¾" to permit its sliding reception within the outer housing. The reference probe shaft 28 of the reference probe 16 preferably projects inwardly a distance of approximately ½". When so dimensioned, suction cups of diameter 1" are sufficient to maintain the positioning of the water level controller 121 on the pool wall.

A receiving slot 64 having dimensions of 1" long by ¼" wide is appropriate for such a construction described above, and electrical contact connectors such as microswitch Model #275-016A manufactured by Radio Shack—Tandy Corporation of Fort Worth, Tex., have proven effective, although other switches would be acceptable. A combined transmitter circuit and receiver unit, such as product number 61-2667A by Radio Shack provides a sender and receiver that are sufficient for most installations. A 12-volt battery, such as Radio Shack battery #23-144 can provide power for such circuit.

An actuator valve assembly 98, such as one having both a solenoid and valve, Model No. L 7010 by J. H. Hardie Irrigation of El Paso, Tex., is presently preferred, although other, analogous units are well known to the art.

In certain environments, the contact switches 66a, 66b (FIGS. 5 and 6) can pose problems as electrical contact is made and broken during operation. An alternative design shown in FIG. 10 utilizes sealed switches that are operated by a magnetic field to considerably simplify the operation of the liquid level sensor. An outer casement 150 is provided a magnet 153 that is attached to a first lateral side 154 thereof. A dampening aperture 155 is formed in an upper surface 157 of the outer casement 150, with an access opening (not shown) provided opposite thereto to enable placement of a sensor circuit housing 161 within the outer casement 150.

A sealed access cover 162 attaches to the sensor circuit housing 161 to create a liquid-tight seal, protecting a sensor circuit 163 that is placed within the sensor circuit housing 161. Included as part of the sensor circuit 163 is an electrical battery 165 that provides electrical power to actuate the circuit.

Included on the sensor circuit 163 is an identical or analogous transmitter unit to that depicted under reference number 36 in FIGS. 5 and 6. The sensor circuit 163 also includes a pair of magnetic reed switches 171. The interaction between the magnet 153 on the outer casement 150 and the pair of magnetic reed switches 171 is best explained with reference to FIG. 11.

As is well known to the art, the magnetic reed switches 171 consist of a pair of electrical leads 175a, 175b that are brought together within a sealed glass envelope 177. Turning now to FIG. 11, as the magnet reed switch 171 is brought into the environment of the magnet 153, the pair of electrical leads 175a, 175b make electrical contact with one another. As the magnetic reed switch 171 is removed from the immediate environment of the magnet 153, the pair of electrical leads 175a, 175b separate from one another, breaking electrical contact.

In operation, as shown in FIG. 12 a liquid level controller 181 is attached to a side of a liquid container, such as the sidewall of the swimming pool 125. The magnet 153 is attached at a fixed position on the outer casement 150. The sensor circuit housing 161 (not shown in FIG. 12) floats within the outer casement 150, with the relative positions of the sensor circuit 163 and the magnet 153 dependant upon the fluctuation of the liquid level within the container. The dampening aperture 155 cooperates with the floating sensor in a manner that dampens movement of the sensor within the outer casement 150. Such dampening provides a more accurate indication of the liquid level, and permits the sensor to disregard momentary fluctuation in that liquid level.

With the outer casement 150 fixedly attached to the sidewall 123, a lowering of the liquid level results in the sensor circuit 163 moving downward relative to the magnet 153, bringing an upper one of the magnetic reed switches 171, causing electrical contact to be established, which in turn results in the transmission of an activation signal to the actuator valve assembly (not shown in FIG. 12). As the liquid level rises, for example upon initiation of a filling operation, the upper one of the magnetic reed switches 171 becomes more distant from the magnet 153, while a lower one of the magnetic reed switches 171 eventually lies adjacent the magnet 153, resulting in the generation and transmission of yet another signal, again activating the actuator valve, ending the filling operation.

My invention has been disclosed in terms of a preferred embodiment thereof, which provides an improved water level controller for swimming pools—or in fact any application where the control of the level of a liquid is important, that is of great novelty and utility. Various changes, modifications, and alterations in the teachings of the present invention may be contemplated by those skilled in the art without departing from the intended spirit and scope thereof. It is intended that the present invention encompass such changes and modifications.

I claim:

1. A liquid level controller for automatically maintaining the liquid level in a reservoir, said apparatus comprising:

an electrically powered liquid level sensor comprising an outer housing having an upper end and a lower end and an opening formed at its lower end, an inner sensor housing slidably received within said outer housing, said inner sensor housing in fluid communication with the liquid in the reservoir through said opening in said outer housing when said outer housing is placed within and attached to a fixed support within the reservoir, a fixed position actuator attached to said outer housing such that said actuator engages said inner sensor housing upon changes in the position of said inner sensor housing within said outer housing, and a receptor attached to said inner sensor housing actuatable upon engagement with said fixed position indicator;

a radio frequency transmitter housed within said inner sensor housing and in electrical communication with said receptor; and a water supply valve in radio-frequency communication with said liquid level sensor in a manner resulting in the selective activation thereof in response to variations in the reservoir water level.

2. The liquid level controller of claim 1, wherein said fixed position actuator comprises a fixed reference probe attached to and projecting from an inside surface of said outer housing.

3. The liquid level controller of claim 2, wherein said receptor comprises a pair of mechanical contact switches.

4. The liquid level controller of claim 1, wherein said fixed position actuator comprises a magnet attached to a lateral surface of said outer housing.

5. The liquid level controller of claim 4, wherein said receptor comprises a magnetic reed switch.

6. The liquid level controller of claim 5, wherein a pair of magnetic reed switches are provided at vertically separated locations within said inner sensor housing, including an upper switch for detecting a high water level and a lower switch for detecting a low water level.

7. The liquid level controller of claim 6, wherein said signal generator comprises a radio-frequency transmitter.

8. The liquid level controller of claim 7, wherein said liquid level sensor is powered by batteries.

* * * * *